Patented Dec. 4, 1945

2,390,046

UNITED STATES PATENT OFFICE 2,390,046

PROCESS FOR RENDERING FIBROUS TEXTILE MATERIALS FAST TO SLIPPING

Otto Albrecht, Neue-Welt, near Basel, Switzerland, assignor to the Swiss firm of Society of Chemical Industry in Basle, Basel, Switzerland No Drawing. Application February 2, 1942, Serial No. 429,337. In Switzerland February 12, 1941

7 Claims. (Cl. 8—116.2)

It has been found that textile fabrics which tend to slip—that is, in which the warp and weft threads are readily displaced when subjected to mechanical stress—can be made fast to slipping by treating them with solutions or dispersions of compounds of the general formula $$R—CH_2—R_1$$

in which R is the radical of a compound which is either resin-like or may be converted into a resin and which contains at least one hydroxyaryl group and $R_1$ is a radical, preferably the isothiourea radical in salt form, which imparts or increases solubility in water and which contains at least one basic nitrogen atom, the radical $R_1$ being united to a nuclear carbon atom of the radical R by means of the $CH_2$-bridge, drying them and, if desired, treating them at raised temperature. Compounds which are resinous or may easily be converted into resinous compounds, for instance, by condensing with formaldehyde are hereinafter designated as resin forming compounds. The expression solution is hereinafter intended to include fine dispersions.

Material which has a tendency to slip—for example, a rayon fabric—is impregnated, at room temperature or at slightly raised temperature, with the solutions or dispersions, for example, with aqueous solutions which contain 0.25 to 1% of compounds of the composition described above, it is then squeezed or hydroextracted and dried, for example, at 105–110° C. It may be advisable then to heat the fibrous material thus obtained for a shorter or longer period at a still higher temperature, for example, at a temperature between 115 and 150° C., but preferably at a temperature lower than 180° C. Temperatures above 180° C. are not to be recommended, as the textile fibres may be damaged at still higher temperatures.

It is very probable that, during the drying process, especially at raised temperatures, a decomposition of the products used in the invention takes place. Since the methylene bridge —$CH_2$— connecting the hydroxy aryl radical of the aforesaid products with the water-solubilizing group is rather sensitive, a decomposition occuring in all probability during the drying step eliminates the solubilizing group and produces fibres coated with water-insoluble resinous substances, that is to say, fibres which no longer slip. In other words, the fact that a basic water-solubilizing group is connected through a methylene bridge with a hydroxy aryl radical is critical for the efficiency of the products used, the methylene bridge causing the decomposability of the products and the cationactivity being responsible for the high efficiency of low concentrations, as will be shown at the end of the introduction.

The compounds to be used in carrying out the present invention are more or less cationactive, according to the nature of the parent materials used in the manufacture, and cause an improvement in the anti-slip properties of the fabric even when used in comparatively low concentrations, the handle of the fabric, in general, not being unfavourably influenced thereby. Further, they improve the fastness to water of dyeings, in many cases, provided that fibrous materials are treated which have been dyed with dyestuffs containing sulfonic acid groups.

The products mentioned may be used either alone or in combination with other products, for example, salts of weak acids.

As compounds of the general formula $$R—CH_2—R_1$$

use is preferably made of compounds of the general formula $$R_2—a—CH_2—R_1$$

in which $R_2$ represents a substituted or unsubstituted cycloaliphatic, cycloaliphatic-aliphatic or aromatic-aliphatic radical, $a$ represents a hydroxyaryl radical, which may also contain other substituents, and $R_1$ has the meaning given above.

As compounds of the general formula $$R_3—a—CH_2—R_1,$$

in which $R_3$ represents a cycloaliphatic or cycloaliphatic-aliphatic radical, and in which $a$ and $R_1$ have the meanings given above, compounds may be used, for instance, which are derived from the known—particularly the resinlike—addition products, containing phenolic hydroxyl groups, of aromatic hydroxy compounds, for example, of phenol, alkylated phenols, such as cresol and the like, with compounds of the terpenic series, especially terpene alcohols or terpene hydrocarbons, such as dipentene, as well as with resin acids, especially those occurring in nature, such as abietic acid or colophony. It is known that intermediate products, insoluble in water, which have the composition $R_2$—$a$—H, in which $R_2$ represents a cycloaliphatic or cycloaliphatic-aliphatic radical and $a$ stands for a hydroxyaryl radical, are prepared from their components by the help of hydrochloric acid, sulphuric acid, para-toluene sulfonic acid, or the like. When condensing in the presence of sulfuric acid, para-toluene sulfonic acid, etc., it is advisable to work at low temperature, for example, between 0° C. and 35° C.

As compounds of the above-mentioned formula $R_2$—$a$—$CH_2$—$R_1$, in which $R_2$ represents an aromatic-aliphatic radical and $a$ and $R_1$ have the meanings already given, products may be used which are derived, for example, from 1:1-di-(p-hydroxyphenyl)-ethane, dihydroxydiphenyl-methane, dihydroxydiphenyl-dimethyl-methane, as well as from condensation products of formaldehyde with aromatic hydroxy compounds, for example, from phenol-formaldehyde condensation products, which are still soluble in organic solvents and are obtained in the presence of acid or alkaline reacting substances.

Water-soluble compounds derived from the above mentioned condensation products of hydroxy compounds of the benzene series with terpenic alcohols, terpenic hydrocarbons, resinous acids occurring in nature and formaldehyde correspond to the formula $R_2$—$a$—$CH_2$—$R_1$ wherein $R_2$ is a substituent the carbon chain of which consists of at least one open chain with 1 to 3 carbon atoms and of at least one six-membered carbon ring, $a$ is an arylene radical of the benzene series containing at least one hydroxy group and $R_1$ has the meaning given above. As is well known, compounds of the terpenic series and resinous acids occurring in nature contain six-membered carbon rings to which side chains with 1 to 3 carbon atoms are fixed; moreover these terpenic and resinous compounds contain carbon chains which may be regarded as being built up of isoprene radicals. Condensation products of hydroxy compounds of the benzene series with formaldehyde also contain carbon chains consisting of at least one open carbon chain with 1 to 3 carbon atoms and of at least one six-membered carbon ring, since, as is well known, the benzene nuclei of these condensation products are connected with one another through —$CH_2$— bridges.

Suitable products derived from the above mentioned formaldehyde condensation products are, for instance, those which correspond to the formula $R_3$—$CH_2$—$R_1$ wherein $R_3$ is a radical of a product obtained by condensing a hydroxyaryl compound of the benzene series, such as phenol, with formaldehyde in the presence of an acid, a nuclear carbon atom of the said radical $R_3$ being connected with the methylene group —$CH_2$—, and where $R_1$ has the meaning given above.

In the formula $R_2$—$a$—$CH_2$—$R_1$, in which $R_2$ and $a$ have the meanings explained above, $R_1$ preferably represents an isothiourea radical in the salt form. Such water-soluble isothiourea salts, as is well known, may be obtained from compounds of the above mentioned formula $R_2$—$a$—H by means of formaldehyde, a thiourea which can react in the iso-form and an acid.

Thioureas capable of reacting in the isoform contain at least one hydrogen atom connected with a nitrogen atom, as every expert knows.

They react as if the atom grouping

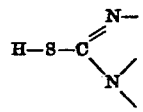

were present in the molecule. Therefore, a substitution, if any, takes place at the sulfur atom, isothiourea radicals of the formula

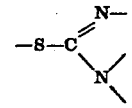

being introduced. Examples of compounds containing isothiourea radicals are the salts of the products of the formula

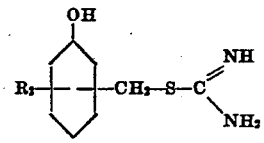

wherein $R_2$ is a radical of the terpenic series such as a dipentene radical or a radical of a resinous acid occurring in nature, for instance, a radical of colophony. Halogen methyl compounds of the formula $R_2$—$a$—$CH_2$— halogen, in which $R_2$ and $a$ have the meanings given above, may also be utilized in the preparation of isothiourea salts by causing them to react upon thioureas which are capable of reacting in the iso-form.

Furthermore, it is possible to obtain the substances of the general formula $R_2$—$a$—$CH_2$—$R_1$ (in which $R_2$ represents an aromatic-aliphatic radical and $R_1$ an isothiourea radical in salt form) which are to be used in carrying out the invention by treating an aromatic hydroxy compound, such as phenol or resorcinol, with formaldehyde and thiourea and with an acid, especially hydrochloric acid, for example, by heating to 100° C., if desired, in the presence of solvents. In such circumstances nuclear condensations take place, by means of which at least two hydroxyl-aryl radicals become united together by means of a methylene bridge.

The products used in the invention are cationactive. This is the reason why they are easily absorbed by textile fibre such as cellulose fibres. Therefore the class of cationactive substances is especially suitable for the improvement of textiles; comparatively low quantities of these cationactive compounds will be sufficient to produce valuable effects since they are so readily absorbed by the textile fibres.

The following examples illustrate the present invention without in any way restricting its scope.

*Example 1*

A solution of 0.25 per cent. strength of the formate of an isothiourea derivative (prepared by the action of the thiourea, formaldehyde and hydrochloric acid on the phenol-like addition product of phenol and dipentene) is prepared and is used to impregnate a viscose rayon fabric which has a tendency to slip, that is to say, of which the warp and weft threads are readily displaced by mechanical strain. The impregnated fabric is then squeezed and dried on the calender at about 105–110° C., when it will be found to be appreciably faster to slipping than an untreated portion of the material.

The formate solution used above can be prepared as follows: 4.6 parts of the known phenol-like addition product of phenol and dipentene are finely powdered and are added to a solution of 3 parts of thiourea in a mixture of 3.3 parts of formaldehyde solution of 36.8 per cent. strength and 3.3 parts of volume of hydrochloric acid of approximately 12-n strength. This reaction mixture is stirred for about 24 hours on a boiling water bath. After cooling, the reaction product, which is a brittle solid, is pulverized and is heated to 50° C. with about 100 parts by volume of very dilute hydrochloric acid. The portion of the reaction product which remains undissolved is filtered off and dried at a low temperature. In order to convert it into the formate, the compound thus obtained is dissolved in warm alcohol, and the solution is poured into water which has been acidified with formic acid. The formate corresponds to the formula

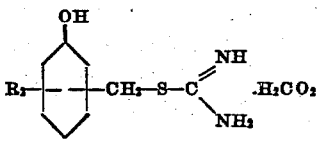

wherein $R_2$ is a radical of dipentene.

Further, in a similar manner the product containing an allyl isothiourea radical instead of the isothiourea radical may be used for rendering textiles fast to slipping.

Example 2

A solution of 0.5 per cent. strength of an isothiourea salt, which is obtainable by reaction of thiourea hydrochloride and formaldehyde and a condensation product of colophony with phenol, prepared in known manner, is prepared and used to impregnate a viscose rayon fabric which has a tendency to slip. The fabric is then squeezed and, after drying on the calender at about 105–110° C., will be found to be appreciably faster to slipping than the original untreated material.

The isothiourea salt can be prepared as follows: 4.3 parts of the condensation product obtained from colophony and phenol in the presence of sulphuric acid of 75 per cent. strength are dissolved in 20 parts by volume of hot isopropyl alcohol. 2.2 parts of thiourea hydrochloride and 1.5 parts of a solution of formaldehyde of 39.9 per cent. strength are added, and the reaction mixture is stirred for about 20 hours in a boiling water bath. 5 parts by volume of concentrated formic acid are added to the clear reaction solution thus obtained, which is then poured hot into about 100 parts by volume of water, the undissolved portions then being removed by filtering. The isothiourea salt which is obtained from the filtrate by evaporation is a powder which, when dissolved in alcohol, gives a clear, foaming solution on addition of water, and which corresponds to the formula

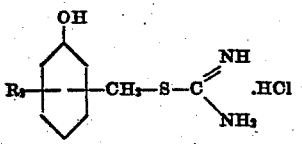

wherein $R_2$ is a radical of colophony. In a similar manner the corresponding derivative of the condensation product of β-naphthol with colophony may be used. Further, corresponding products containing an allyl isothiourea radical instead of the isothiourea radical may be used for rendering textiles fast to slipping.

Example 3

A solution of 1 per cent. strength of the isothiourea hydrochloride which is obtained by the reaction of thiourea, formaldehyde and hydrochloric acid on 1:1-di-(p-hydroxyphenyl)-ethane is prepared and used to impregnate a viscose rayon fabric which has a tendency to slip, which is then squeezed. After drying it on the calender at about 105–110° C., the treated fabric will be found to be much faster to slipping than the untreated.

The isothiourea hydrochloride used can be prepared as follows:

5.3 parts of finely powdered 1:1-di-(p-hydroxyphenyl)-ethane are stirred with 3.8 parts of finely powdered thiourea, 3.8 parts by volume of formaldehyde solution of 39.9 per cent. strength by volume and 4.1 parts by volume of 12.2-n-hydrochloric acid for 24 hours in a boiling water bath. The reaction product is separated after cooling, when it is twice boiled up with acetone and then, after decanting the acetone, freed from remaining solvent at low temperature. The isothiourea hydrochloride thus obtained, a pale yellow, brittle mass, after dissolving in alcohol gives an opalescent solution when diluted with water.

Example 4

An aqueous solution of 1 per cent. strength is prepared from the condensation product obtained by the reaction of thiourea, formaldehyde and hydrochloric acid on phenol and is used to impregnate a viscose rayon fabric which has a tendency to slip. The fabric is squeezed and dried on the calender at about 105–110° C., when it will be found to be much faster to slipping than the untreated material.

The condensation product used can be obtained as follows:

94 parts of phenol are stirred with 76 parts of thiourea, 75 parts of formaldehyde solution of 39.9 per cent. strength by volume and 82 parts by volume of 12.2-n hydrochloric acid for 20 hours in a boiling water bath. The unchanged phenol is removed from the clear solution thus obtained by means of steam. The aqueous solution which is formed by the steam distillation—if necessary, after further addition of water—is poured off the lower layer of resinous matter, and the condensation product is salted out by means of sodium chloride. This is then treated with an acetone-ether mixture, dissolved in a little alcohol in order to remove the sodium chloride and, after filtering, freed from solvent at low temperature. The condensation product thus obtained is a colourless, solid mass which is readily dissolved by water to form a clear solution, and which corresponds to the formula

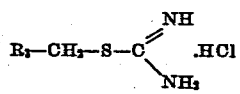

wherein $R_3$ is a radical of the product obtained by condensing phenol with formaldehyde in the presence of hydrochloric acid.

In a similar manner the corresponding product containing an allyl isothiourea radical instead of the isothiourea radical may be used for rendering textiles fast to slipping.

What I claim is:

1. Process for rendering fibrous textile material fast to slipping which comprises impregnating the material with a solution containing a compound of the general formula

wherein $R_2$ is a substituent the carbon chain of which consists of at least one open chain with 1 to 3 carbon atoms and of at least one six-membered carbon ring the carbon chain of the said substituent $R_2$ being built up of isoprene radicals, $a$ is an arylene radical of the benzene series containing at least one hydroxy group, and wherein $R_1$ is an isothiourea radical in salt form, and then drying the impregnated material.

2. Process for rendering fibrous textile material fast to slipping which comprises impregnating the material with a solution containing a compound of the general formula

wherein $R_2$ is a radical of the terpenic series, $a$ is an arylene radical of the benzene series containing at least one hydroxy group, and wherein $R_1$ is an isothiourea radical in salt form, and then drying the impregnated material.

3. Process for rendering fibrous textile material fast to slipping which comprises impregnating the material with a solution containing a compound of the general formula

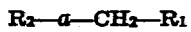

wherein $R_2$ is a radical of dipentene, $a$ is an arylene radical of the benzene series containing at least one hydroxy group and wherein $R_1$ is an isothiourea radical in salt form, and then drying the impregnated material.

4. Process for rendering fibrous textile material fast to slipping which comprises impregnating the material with a solution containing a salt of a compound of the formula

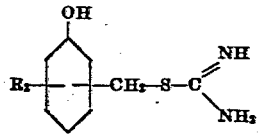

wherein $R_2$ is a radical of dipentene, then drying the impregnated material, and subjecting the treated material to a heating treatment at less than 180° C.

5. Process for rendering fibrous textile material fast to slipping which comprises impregnating the material with a solution containing a compound of the general formula

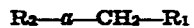

wherein $R_2$ is a radical of a resinous acid occurring in nature, $a$ is an arylene radical of the benzene series containing at least one hydroxy group, and wherein $R_1$ is an isothiourea radical in salt form, and then drying the impregnated material.

6. Process for rendering fibrous textile material fast to slipping which comprises impregnating the material with a solution containing a compound of the general formula

wherein $R_2$ is a radical of colophony, $a$ is an arylene radical of the benzene series containing at least one hydroxy group, and wherein $R_1$ is an isothiourea radical in salt form, and then drying the impregnated material.

7. Process for rendering fibrous textile material fast to slipping which comprises impregnating the material with a solution containing a salt of a compound of the formula

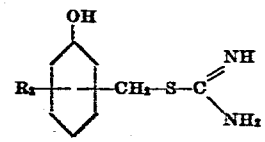

wherein $R_2$ is a radical of colophony, then drying the impregnated material, and subjecting the treated material to a heating treatment at less than 180° C.

OTTO ALBRECHT.